No. 736,960. PATENTED AUG. 25, 1903.
A. GUSINDE.
DEVICE FOR TEACHING MUSIC AND SINGING.
APPLICATION FILED APR. 16, 1903.

NO MODEL.

WITNESSES
H. Maxwell Kuehne
John A. Percival

INVENTOR
Alois Gusinde

BY Richard
ATTORNEYS

THE NORRIS PETERS CO., PHOTO-LITHO., WASHINGTON, D. C.

No. 736,960. Patented August 25, 1903.

UNITED STATES PATENT OFFICE.

ALOIS GUSINDE, OF BERLIN, GERMANY.

DEVICE FOR TEACHING MUSIC AND SINGING.

SPECIFICATION forming part of Letters Patent No. 736,960, dated August 25, 1903.

Application filed April 16, 1903. Serial No. 152,933. (No model.)

*To all whom it may concern:*

Be it known that I, ALOIS GUSINDE, rector, a subject of the Emperor of Germany, residing in Berlin, in the Empire of Germany, (whose full postal address is 41 Mohrenstrasse, Berlin, aforesaid,) have invented a certain new and useful Device for Teaching Music and Singing, of which the following is a full, clear, and exact specification.

The object of this invention is to represent the notes in a concrete form and according to their length on a tablet, and, further, by employing a tablet furnished with a musical staff to enable the notes to be systematically produced in accordance with the sounds corresponding to the notes.

The means of instruction consist of plates or strips of sheet metal made into the form of note-heads, note-stems, ledger-lines, and quaver-marks, the backs of which are furnished with one or two pins, by means of which they can be firmly attached to a tablet made of suitably soft material, so that on this tablet and out of the said parts the notes of different lengths can be systematically produced and so far as the tablet is furnished with staff-lines the positions of the notes corresponding to the different sounds be also represented by concrete visible signs.

Figure 1:
Figure 2:
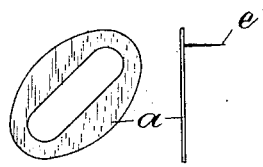
Figure 3:
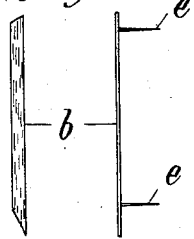
Figure 4:
Figure 5:
Figure 6:
Figure 6:
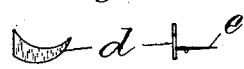
Figure 6:

Figure 1 of the accompanying drawings illustrates the putting together of the parts of the different kinds of notes on a tablet provided with staff-lines. Figs. 2 to 6 furnish front and side views of the separate parts of the notes.

The heads *a g*, stems *b*, ledger-lines *c*, and quaver-marks *d* are stamped out of sheet metal as independent parts and provided with one or two pins *e*, by means of which they can be attached to a tablet *f*, made of cork, compressed peat, or linoleum. With the head-piece *a*, Fig. 2, which represents a semibreve, and the stem *b*, Fig. 3, a minim may be formed. With the solid head-piece *g*, Fig. 5, and the stem *b*, Fig. 3, crotchets can be formed, and by the addition of one, two, or three quaver-marks *d*, Fig. 6, quavers, semiquavers, or demisemiquavers. When the tablet employed for fixing the different parts of the notes, as shown in Fig. 1, has been furnished with staff-lines by putting on the parts of the notes, the positions of the notes corresponding to the different tones and the length of the notes can be simultaneously illustrated in a concrete form on the staff-lines. The pieces *c*, Fig. 4, serve in connection herewith as ledger-lines for representing the notes lying above or below the ordinary staff-lines.

The means of instruction described enables the recognized principle of objective intuition to be applied in systematically teaching music and singing, whereby the understanding of the notes and of the sounds corresponding thereto is facilitated and the interest of the pupil aroused and sustained. From an economical point of view this means of instruction presents the advantage, first, that it can be put into practical form much more simply than if the different kinds of notes were made as complete representations consisting of a single piece, and, secondly, that with a relatively small number of notes made in separate parts and by the employment of bar-lines and signature whole pieces of music with any variety of notes can be formed, as the parts of the notes which do not appear at all or only in slight numbers in the particular pieces can be simply added to the notes which occur frequently—an advantage which is entirely lost when notes made in a single piece are employed.

What I claim, and desire to secure by Letters Patent, is—

1. Apparatus for teaching music and singing consisting of plates or strips made in the form of note-heads, stems, quaver-marks, and ledger-lines, a tablet made of penetrable material and means for attaching the parts to the tablet to produce notes of different length substantially as described.

2. Apparatus for teaching music and singing consisting of plates or strips made in the form of note-heads, stems, quaver-marks, and ledger-lines, pins on the said plates, and a tablet provided with staff-lines and to which the musical signs are attached by the pins substantially as described.

In witness whereof I have hereunto set my hand in presence of two witnesses.

ALOIS GUSINDE.

Witnesses:
 WOLDEMAR HAUPT,
 HENRY HASPER.